US008330827B2

(12) United States Patent
Wang

(10) Patent No.: US 8,330,827 B2
(45) Date of Patent: Dec. 11, 2012

(54) INCREASING IMAGE RESOLUTION USING COMBINED DIFFERENTIAL IMAGE

(75) Inventor: Sen Wang, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 359 days.

(21) Appl. No.: 12/621,554

(22) Filed: Nov. 19, 2009

(65) Prior Publication Data

US 2011/0115934 A1    May 19, 2011

(51) Int. Cl.
*H04N 5/228* (2006.01)
*H04N 5/217* (2011.01)
*G06K 9/32* (2006.01)

(52) U.S. Cl. .................. 348/222.1; 348/241; 382/299; 382/300

(58) Field of Classification Search .............. 348/222.1, 348/208.13, 240.2, 241, 252; 382/299, 300, 382/275, 260, 261, 263
See application file for complete search history.

(56) References Cited

U.S. PATENT DOCUMENTS

| | | | |
|---|---|---|---|
| 6,075,889 A * | 6/2000 | Hamilton et al. ............ 382/167 |
| 7,106,914 B2 | 9/2006 | Tipping et al. |
| 7,239,428 B2 | 7/2007 | Solecki |
| 7,477,802 B2 | 1/2009 | Milanfar et al. |
| 7,548,662 B2 | 6/2009 | Basu et al. |
| 7,583,860 B2 | 9/2009 | Kuo et al. |
| 8,203,615 B2 * | 6/2012 | Wang et al. ................ 348/208.4 |
| 2006/0087703 A1 * | 4/2006 | Chen et al. .................. 358/463 |
| 2006/0104540 A1 | 5/2006 | Haussecker et al. |
| 2009/0034866 A1 * | 2/2009 | Park et al. .................... 382/263 |
| 2010/0074552 A1 * | 3/2010 | Sun et al. .................... 382/264 |

OTHER PUBLICATIONS

W. T. Freeman et al., "Example-based super-resolution" IEEE Computer Graphics and Applications, vol. 22, pp. 56-65 (2002).
J. Sun et al., "Image super-resolution using gradient profile prior," IEEE Conference on Computer Vision and Pattern Recognition, pp. 1-8, 2008.
M. E. Tipping et al., "Basyesian image super-resolution," in Advances in Neural Information Processing, MIT Press, 2003.
B. Bascle et al., "Motion deblurring and super-resolution from an image sequence," Proceedings of the Fourth European Conference on Computer Vision, pp. 573-582, 1996.
D. Capel et al., "Super-resolution enhancement of text image sequences," Proc. 15th International Conference on Pattern Recognition, pp. 600-605 2000.

* cited by examiner

*Primary Examiner* — Chieh M Fan
*Assistant Examiner* — Carramah J Quiett
(74) *Attorney, Agent, or Firm* — Kevin E. Spaulding

(57) ABSTRACT

A method for increasing the resolution of a digital image comprising: receiving an input digital image of a scene; interpolating a high-resolution image using an interpolation function; receiving a blur kernel associated with the interpolation function; initializing a candidate sharp high-resolution image; determining a plurality of differential images representing differences between neighboring pixels in the candidate sharp high-resolution image; determining a combined differential image by combining the differential images; repeatedly updating the candidate sharp high-resolution image responsive to the interpolated high-resolution image, the blur kernel, the candidate sharp high-resolution image and the combined differential image until a convergence criterion is satisfied; and storing the final candidate sharp high-resolution image in a processor-accessible memory system.

16 Claims, 6 Drawing Sheets

| 1 | 6 | 11 | 16 | 21 |
|---|---|----|----|----|
| 2 | 7 | 12 | 17 | 22 |
| 3 | 8 | 13 | 18 | 23 |
| 4 | 9 | 14 | 19 | 24 |
| 5 | 10 | 15 | 20 | 25 |

*FIG. 6*

INCREASING IMAGE RESOLUTION USING COMBINED DIFFERENTIAL IMAGE

CROSS-REFERENCE TO RELATED APPLICATIONS

Reference is made to commonly assigned, co-pending U.S. Patent Application Publication No. 2011/0090378 published Apr. 12, 2011, entitled: "Image deblurring using panchromatic pixels", by Wang et al., to commonly assigned, co-pending U.S. Patent Application Publication No. 2011/0090352 published Apr. 12, 2011, entitled: "Image deblurring using a spatial image prior", by Wang et al., and to commonly assigned, co-pending U.S. Patent Application Publication No. 2011/0102642 published May 5, 2011, entitled: "Image deblurring using a combined differential image", by Wang et al., all of which are incorporated herein by reference.

FIELD OF THE INVENTION

This invention pertains to the field of image resizing and more particularly to a method for determining a super-resolution image.

BACKGROUND OF THE INVENTION

Digital image capture devices such as digital cameras and scanners have an associated image resolution. In many applications, it may be necessary or desirable to obtain a higher resolution version of a digital image than is supported by the digital image capture device. For example, if it is desired to print a digital image having one resolution on a digital printer having a higher resolution, it is necessary to somehow up-sample the digital image data.

The simplest methods for increasing the resolution of an image is to use an interpolation method to estimate new pixel values at the higher resolution. Well-known interpolation methods such as nearest neighbor, bilinear and bicubic interpolation algorithms are commonly used for this purpose. However, the result of such algorithms is that the interpolated images tend to be lower in quality than an image captured using a digital image capture device having the higher resolution. For example, a sharp edge transition in a 300 dpi image will be turned into a "blurred" edge transition in a 600 dpi image determined using bilinear interpolation.

Interpolation methods are fundamentally limited by the well-known Nyquist-Shannon sampling theory which implies that it is impossible to reconstruct information about spatial frequencies higher than the Nyquist frequency (half the sampling frequency) without a priori knowledge about the scene.

Various methods for determining higher resolution images have been developed which attempt to overcome the limitation of the Nyquist-Shannon sampling theory by incorporating additional image information. These techniques are generally referred to as "super resolution" algorithms.

Some techniques such as that disclosed by Kuo et al. in U.S. Pat. No. 7,583,860, entitled "Method for producing enhanced-resolution image by use of a plurality of low-resolution images," reconstruct a high-resolution image by using information for a plurality of low-resolution images.

In U.S. Pat. No. 7,106,914 entitled "Bayesian image super resolution," Tipping et al have disclosed a method for determining the most likely high-resolution image given a set of multiple low-resolution images using a Bayesian inference model.

U.S. Pat. No. 7,477,802 to Milanfar et al., entitled "Robust reconstruction of high resolution grayscale images from a sequence of low resolution frames" discloses a method for creating a super-resolution image from a set of lower-resolution images which incorporates an energy function having a data fidelity penalty term and a spatial penalty term that encourages sharp edges in the high-resolution image.

While methods that utilize multiple images have utility for applications such as video which involve capturing multiple images, they are not useful for cases where only a single input image is available.

In the article "Image super-resolution using gradient profile prior" (IEEE Conference on Computer Vision and Pattern Recognition, pp. 1-8, 2008), J. Sun et al. have disclosed a method for determining a high resolution image from a single low-resolution image. This technique involves analyzing a gradient map to determine a parametric model describing the shape and sharpness of gradients occurring in the image. The edge gradient information can then be used to form a high-resolution image that preserves the edge characteristics.

In the article "Example-based super-resolution" (IEEE Computer Graphics and Applications, Vol. 22, pp. 56-65, 2002), W. T. Freeman et al. have disclosed a training-based super-resolution algorithm. The algorithm involves performing a nearest-neighbor search in a training set for a vector derived from each patch of local image data.

SUMMARY OF THE INVENTION

The present invention represents a method for increasing the resolution of a digital image, the method implemented at least in part by a data processing system and comprising:

a) receiving an input digital image of a scene;

b) interpolating a high-resolution image from the input digital image using an interpolation function, wherein the interpolated high-resolution image has a higher resolution than the input digital image;

c) receiving a blur kernel associated with the interpolation function;

d) initializing a candidate sharp high-resolution image;

e) determining a plurality of differential images representing differences between neighboring pixels in the candidate sharp high-resolution image;

f) determining a combined differential image by combining the differential images;

g) updating the candidate sharp high-resolution image responsive to the interpolated high-resolution image, the blur kernel, the candidate sharp high-resolution image and the combined differential image;

h) repeating steps e)-g) until a convergence criterion is satisfied; and i) storing the final candidate sharp high-resolution image in a processor-accessible memory system.

This invention has the advantage that it produces sharp high-resolution image images from a single low-resolution image.

It has the additional advantage that it is computationally efficient.

It has the additional advantage that it produces sharp high-resolution image images having fewer ringing artifacts than prior art super-resolution algorithms.

BRIEF DESCRIPTION OF THE DRAWINGS

FIG. 6 shows an array of indices that can be used to determine the differential images.

DETAILED DESCRIPTION OF THE INVENTION

Figure 1:
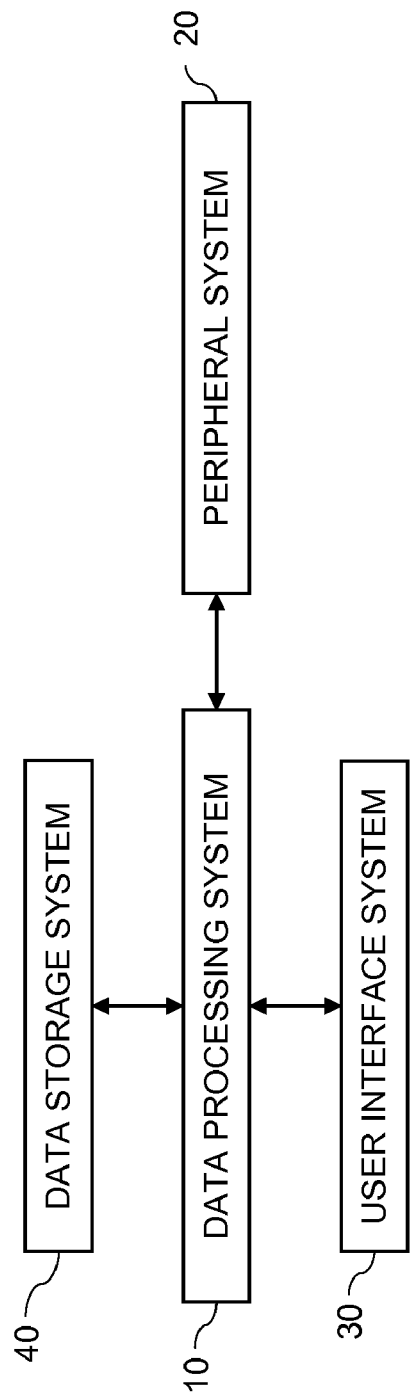
FIG. 1 is a high-level diagram showing the components of a system for classifying digital image according to an embodiment of the present invention.

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image file", as used herein, refers to any digital image file, such as a digital still image or a digital video file.

As described in the background section, conventional interpolation-based resolution-enhancement algorithms produce high-resolution images that are effectively blurred by the interpolation function. Such blur can be viewed as somewhat analogous to other types of image blur such as lens blur due to defocus and other aberrations in the optical system of the digital imaging device, and motion blur resulting from the relative motion between a camera and a scene during the exposure time (integration time) associated with image capture.

Image enhancement algorithm have been developed to compensate for blur in a digital image. Such algorithms are often referred to as "deblurring" or "deconvolution" algorithms. Such algorithms can be roughly classified into two categories: "blind" and "non-blind". If a blur kernel associated with the image blur is not known, then the problem is said to be "blind deconvolution," whereas when the blur kernel is known it is said to be "non-blind deconvolution."

For non-blind deconvolution, the most common technique is Richardson-Lucy (RL) deconvolution. (See the articles: W. H. Richardson, "Bayesian-based iterative method of image restoration," Journal of the Optical Society of America, Vol. 62, pp. 55-59, 1972, and L. B. Lucy, "An iterative technique for the rectification of observed distributions," Astronomical Journal, vol. 79, pp. 745-754, 1974.) This method involves the determination of a deblurred image (sometimes referred to as a "latent image") under the assumption that its pixel intensities conform to a Poisson distribution.

In the article "Improved image deblurring with anti-reflective boundary conditions and re-blurring" (Inverse Problems, Vol. 22, pp. 2035-2053, 2006), Donatelli et al. use a Partial Differential Equation (PDE)-based model to recover a deblurred image with reduced ringing by incorporating an anti-reflective boundary condition and a re-blurring step.

In the article "Progressive inter-scale and intra-scale non-blind image deconvolution" (ACM Transactions on Graphics, Vol. 27, Iss. 3, 2008), Yuan, et al. disclose a progressive inter-scale and intra-scale non-blind image deconvolution approach that significantly reduces ringing.

Blind deconvolution is an ill-posed problem, which is significantly more challenging. Approaches to pure blind deconvolution apply to either single blurred image or multiple blurred images. The most challenging problem is single-image blind deblurring, which requires the simultaneous estimation of the deblurred image and the Point Spread Function (PSF) associated with the image blur.

In the article "Removing camera shake from a single photograph" (ACM Transactions on Graphics, Vol. 25, pp. 787-794, 2006), Fergus et al. show that blur kernels are often complex and sharp. They teach an ensemble learning approach to recover a blur kernel, while assuming a certain statistical distribution for natural image gradients.

In the article "High-quality motion deblurring from a single image" (ACM Transactions on Graphics, Vol. 27, pp. 1-10, 2008), Shan et al. disclose a method for removing motion blur using a unified probabilistic model of both blur kernel estimation and unblurred image restoration.

In the article "Understanding and evaluating blind deconvolution algorithms" (Proc. IEEE Conf. on Computer Vision and Pattern Recognition, 2009), Levin, et al. described and evaluated a number of single-image blind deconvolution algorithms.

In the article "Image and depth from a conventional camera with a coded aperture" (ACM Transactions on Graphics, Vol. 26, Issue 6, 2007), Levin et al. employ a coded aperture to obtain an approximate blur kernel which can be used in a deblurring algorithm. This deblurring approach is limited to image blur caused by defocus.

In commonly assigned, co-pending U.S. patent application Ser. No. 11/613,135 filed Nov. 4, 2009, entitled: "Image deblurring using a combined differential image", Sen et al. teach a method for deblurring digital images using a combined differential image as an image prior. The present invention represents an extension of this method to the problem of increasing the resolution of a digital image.

FIG. 1 is a high-level diagram showing the components of a system for determining a sharp high-resolution image according to an embodiment of the present invention. The system includes a data processing system 10, a peripheral system 20, a user interface system 30, and a data storage system 40. The peripheral system 20, the user interface system 30 and the data storage system 40 are communicatively connected to the data processing system 10.

The data processing system 10 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 40 includes one or more processor-accessible memories configured to store information, including the information needed to execute the processes of the various embodiments of the present invention, including the example processes described herein. The data storage system 40 may be a distributed processor-accessible memory system including multiple processor-accessible memories communicatively connected to the data processing system 10 via a plurality of computers or devices. On the other hand, the data storage system 40 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 40 is shown separately from the data processing system 10, one skilled in the art will appreciate that the data storage system 40 may be stored completely or partially within the data processing system 10. Further in this regard, although the peripheral system 20 and the user interface system 30 are shown separately from the data processing system 10, one skilled in the art will appreciate that one or both of such systems may be stored completely or partially within the data processing system 10.

The peripheral system 20 may include one or more devices configured to provide digital content records to the data processing system 10. For example, the peripheral system 20 may include digital still cameras, digital video cameras, cellular phones, or other data processors. The data processing system 10, upon receipt of digital content records from a device in the peripheral system 20, may store such digital content records in the data storage system 40.

The user interface system 30 may include a mouse, a keyboard, another computer, or any device or combination of devices from which data is input to the data processing system 10. In this regard, although the peripheral system 20 is shown separately from the user interface system 30, the peripheral system 20 may be included as part of the user interface system 30.

The user interface system 30 also may include a display device, a processor-accessible memory, or any device or combination of devices to which data is output by the data processing system 10. In this regard, if the user interface system 30 includes a processor-accessible memory, such memory may be part of the data storage system 40 even though the user interface system 30 and the data storage system 40 are shown separately in FIG. 1.

The present invention will now be described with reference to FIG. 2. A receive low-resolution image step 100 is used to receive a low-resolution image 101 of a scene. Next, an interpolate high-resolution image step 102 is used to determine an interpolated high-resolution image 103 by applying an interpolation function. Any interpolation function known in the art can be used for the interpolate high-resolution image step 102. In a preferred embodiment of the present invention, the interpolation function is a well-known bi-cubic interpolation function or a b-linear interpolation functions. Other types of interpolation functions such as nearest-neighbor interpolation functions can also be used.

Figure 3:
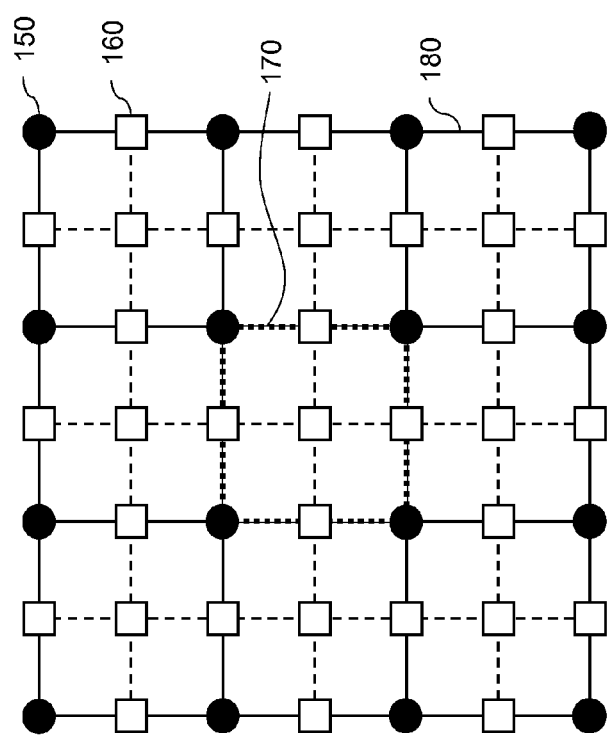
FIG. 3 illustrates using an interpolation function to increase the resolution of an input image.

FIG. 3 illustrates how an interpolation function can be used to increase the resolution of an input digital image. An input digital image has input pixel values at input pixel locations 150 shown using solid circles. If it is desired to increase the image resolution by a factor of 2× in both the horizontal and vertical directions, then the interpolation function needs to determine interpolated pixel values at the output pixel locations 160 shown by the open squares. It will be obvious to one skilled in the art that other magnification factors besides 2× can be used, including non-integer magnification factors. Interpolation function generally work by determining the interpolated pixel values by a weighted combination of the input pixel values in a neighborhood around a particular output pixel location. For example, for output pixels within an inter-pixel area 170, between a 2×2 block of input pixel locations 160, a bi-cubic interpolation function will compute a weighted sum of the input pixel values for the input pixels within the interpolation neighborhood 180. The weights for each of the input pixels will be a function of the position of the output pixel location 160 within the inter-pixel area. The exact details of bi-cubic and bi-linear interpolation functions are well-known to those skilled in the art, and will not be repeated here.

Figure 2:
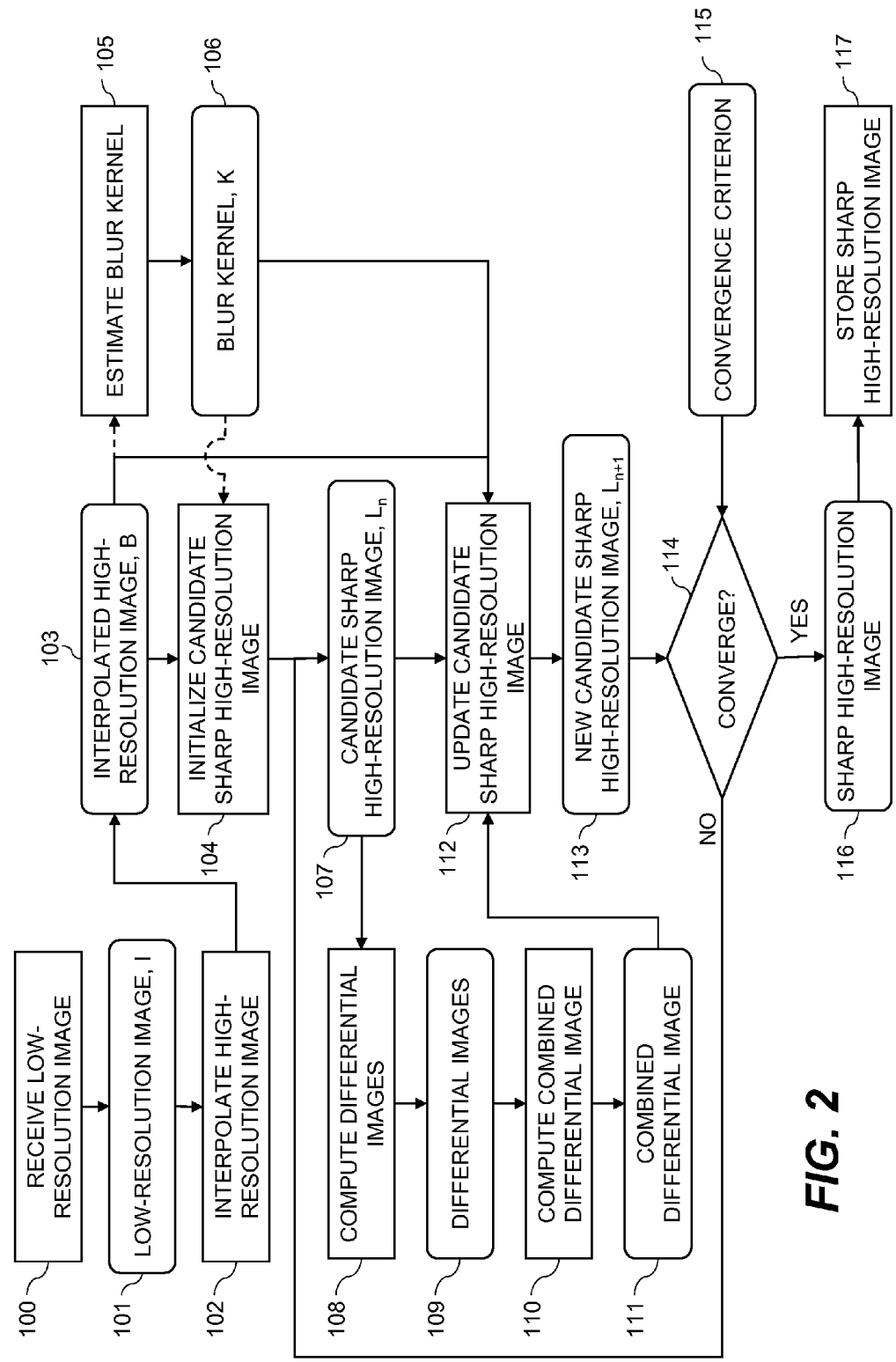
FIG. 2 is a flowchart for a preferred embodiment of the present invention.
Figure 4:
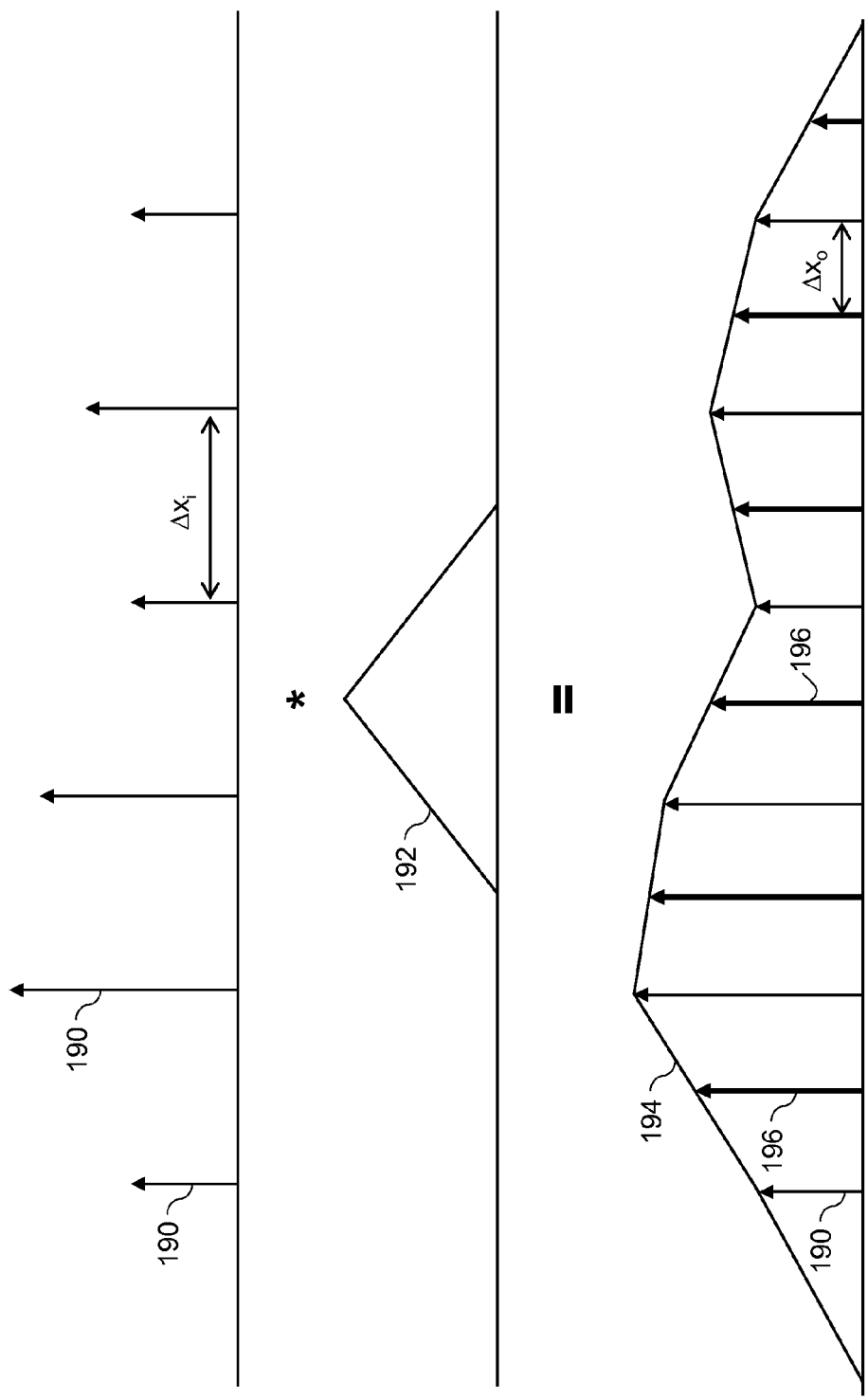
FIG. 4 is a diagram illustrating how interpolation can be modeled using convolution and sampling operations.

Returning now to a discussion of FIG. 2, an estimate blur kernel step 105 is now used to determine a blur kernel 106. The blur kernel 106 is a convolution kernel that could be applied to a sharp image of the scene to produce an image having sharpness characteristics approximately equal to the interpolated high-resolution image 103. Many types of interpolation functions can be modeled as a convolution operation with a blur kernel followed by a re-sampling operation. For example, FIG. 4 shows an example of how one-dimensional linear interpolation can be modeled in this fashion. A set of input points 190 separated by an input spacing $\Delta x_i$ represent the points of a low-resolution image. A triangular blur kernel 192 having a total width 2× the spacing between the input points 190 is convolved with the array of input points 190 to produce the interpolation line 194. It can be seen that the interpolation line 194 represents linear connections between the input points 190. The interpolation line 194 is then sampled at an array of position having an output spacing $\Delta x_O$ to determine the interpolated points 195. In this example, the output spacing is one half of the input spacing which corresponds to a 2× resolution increase.

The exact form of the blur kernel will be a function of the particular type of interpolation function (e.g., bi-cubic or bi-linear) as well as the resolution difference between the low-resolution digital image 101 and the interpolated high-resolution image 103 (e.g., 2×) In a preferred embodiment of the present invention, the blur kernel 106 is determined analytically from a knowledge of the interpolation function and the resolution difference between the low-resolution digital image 101 and the interpolated high-resolution image 103. In one embodiment of the present invention, a mathematically exact blur kernel 106 is determined. For example, the blur kernel for an interpolated high-resolution image determined using bi-linear interpolation with a 2× resolution increase would be given by:

$$K(x, y) = Tri(x/2)Tri(y/2) \quad (1)$$

where $$Tri(x) = \begin{cases} 0; & |x| \geq 1 \\ 1-|x|; & |x| < 1 \end{cases} \quad (2)$$

Alternately the blur kernel 106 can be approximated using a functional form such as a Gaussian function, where the width of the Gaussian function is selected according to the interpolation function and the resolution difference between the low-resolution digital image 101 and the interpolated high-resolution image 103.

As will be discussed in more detail with reference to FIG. 5, in an alternate embodiment of the present invention, the blur kernel 106 is optionally determined responsive to the interpolated high-resolution image 103.

Next an initialize candidate sharp high-resolution image step 104 is used to initialize a candidate sharp high-resolution image 107 responsive to the interpolated high-resolution image 103. In a preferred embodiment of the present invention, the candidate sharp high-resolution image 107 is initialized by simply setting it equal to the interpolated high-resolution image 103. Optionally, any deconvolution algorithm known to those in the art can be used to process the interpolated high-resolution image 103 using the blur kernel 106. Examples of such deconvolution algorithms would include conventional frequency domain filtering algorithms such as the well-known Richardson-Lucy (RL) deconvolution method described in the background section.

Next a compute differential images step 108 is used to determine a plurality of differential images 109. The differential images 109 can include differential images computed by calculating numerical derivatives in different directions (e.g., x and y) and with different distance intervals (e.g., Δx=1, 2, 3). A compute combined differential image step 110 is used to form a combined differential image 111 by combining the differential images 109.

Next an update candidate sharp high-resolution image step 112 is used to compute a new candidate sharp high-resolution image 107 responsive to the interpolated high-resolution image 103, the blur kernel 106, the candidate sharp high-resolution image 107, and the combined differential image 111. As will be described in more detail later, in a preferred embodiment of the present invention, the update candidate sharp high-resolution image step 112 employs a Bayesian inference method using Maximum-A-Posterior (MAP) estimation.

Next, a convergence test 114 is used to determine whether the deblurring algorithm has converged by applying a convergence criterion 115. The convergence criterion 115 can be specified in any appropriate way known to those skilled in the art. In a preferred embodiment of the present invention, the convergence criterion 115 specifies that the algorithm is terminated if the mean square difference between the new candidate sharp high-resolution image 107 and the candidate sharp high-resolution image 107 is less than a predetermined threshold.

Alternate forms of convergence criteria are well known to those skilled in the art. As an example, the convergence criterion 115 can be satisfied when the algorithm is repeated for a predetermined number of iterations. Alternatively, the convergence criterion 115 can specify that the algorithm is terminated if the mean square difference between the new candidate sharp high-resolution image 107 and the candidate sharp high-resolution image 107 is less than a predetermined threshold, but is terminated after the algorithm is repeated for a predetermined number of iterations even if the mean square difference condition is not satisfied.

If the convergence criterion 115 has not been satisfied, the candidate sharp high-resolution image 107 is updated to be equal to the new candidate sharp high-resolution image 113. If the convergence criterion 115 has been satisfied, a sharp high-resolution image 116 is set to be equal to the new candidate sharp high-resolution image 107. A store sharp high-resolution image step 117 is then used to store the resulting sharp high-resolution image 116 in a processor-accessible memory. The processor-accessible memory can be any type of digital storage such as RAM or a hard disk.

In one embodiment of the present invention, the interpolated high-resolution image 103 is captured using a digital camera. Alternately the interpolated high-resolution image 103 can be obtained using an image scanner, or can be a frame of a digital video.

Figure 5:
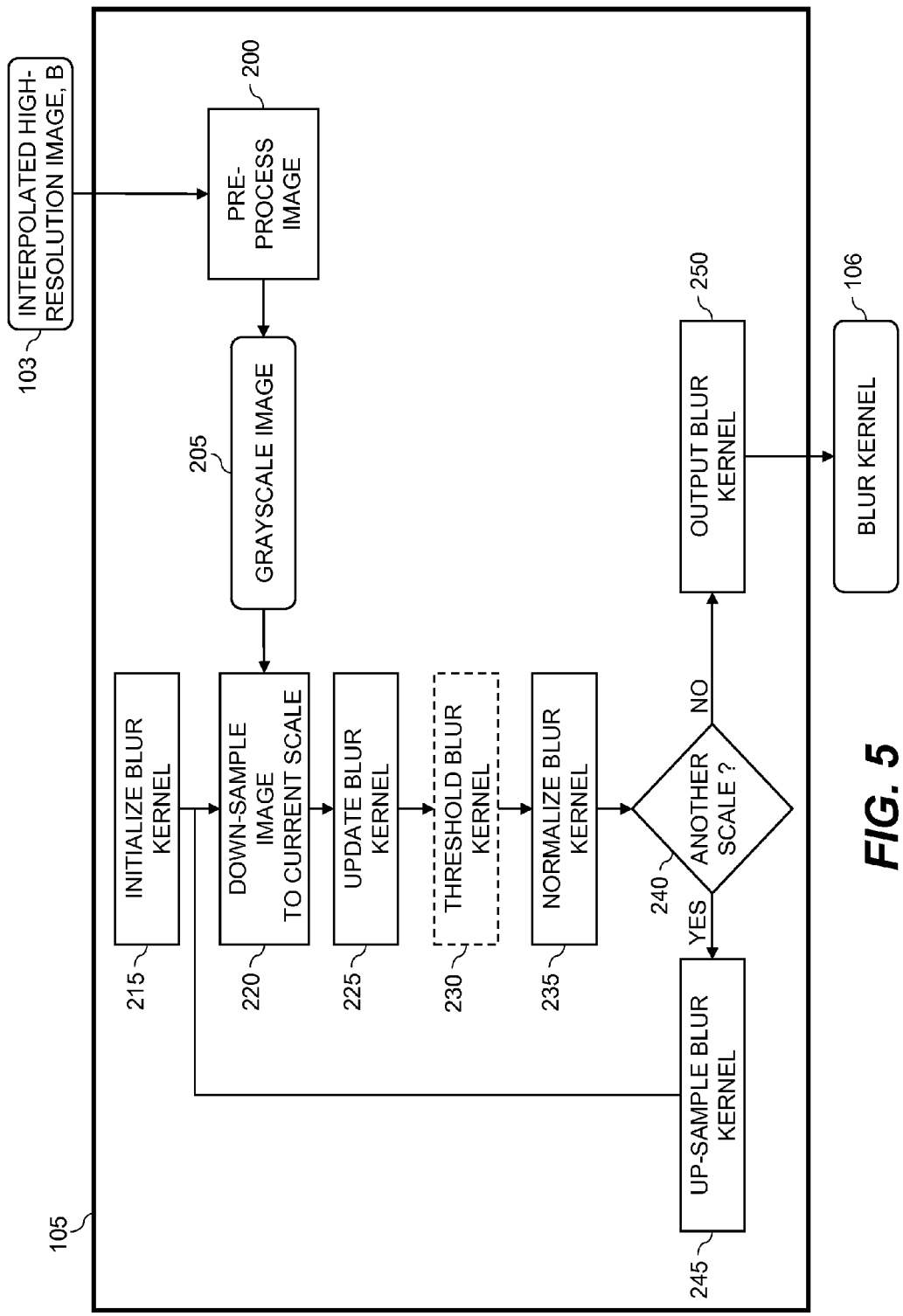
FIG. 5 is a flowchart showing additional details for the estimate blur kernel step in FIG. 2 according to a preferred embodiment of the present invention.

FIG. 5 shows a flow chart giving more details of the estimate blur kernel step 105 according to an alternate embodiment of the present invention. A pre-process images step 200 is used to compute a grayscale image 205 from the interpolated high-resolution image 103. The blur kernel 106 will generally be independent of the color channel since the same interpolation method will typically be applied to each color channel. Therefore, it is generally preferable to determine the blur kernel 106 using a grayscale version of the interpolated high-resolution image 103. The conversion from a color image to a grayscale image can be performed using any method known in the art. In a preferred embodiment of the present invention, the grayscale image is determined by performing a weighted summation of the color channels:

$$P = a_r R + a_g G + a_b B \quad (3)$$

where R, G and B are pixel values for the red, green and blue color channels of the interpolated high-resolution image 103, respectively, $a_r$, $a_g$ and $a_b$ are constants, and P is a pixel value of the grayscale image.

The pre-process images step 200 can also perform other functions in addition to converting the images to a grayscale format. For example, the pre-process images step 200 can apply a denoising algorithm to the interpolated high-resolution image 103 to reduce the noise level. There are many denoising algorithms that are well known in the art, such as median filtering algorithms.

The pre-process images step 200 can also be used to crop out a subset of the interpolated high-resolution image 103 to increase the computational efficiency. Preferably, an image region having significant image detail (high deviations of intensity) is selected since that is where the effect of the image blur will be most significant. Such an image region can be determined by applying a Laplacian operator to the interpolated high-resolution image 103 to form a Laplacian image, and then selecting a region of the Laplacian image having high signal levels. The selected image region can be a contiguous image region, such as a rectangular region of a particular size, or alternately, the selected image region can comprise a subset of image pixels scattered throughout the image, such as a neighborhoods of image pixels surrounding image pixels in the Laplacian image where the magnitude exceeds a predefined threshold. In an alternate embodiment of the present invention, the image region can be manually user-selected.

In one embodiment of the present invention, the blur kernel 106 is determined with a Bayesian inference method using Maximum-A-Posterior (MAP) estimation. Using this method the blur kernel 106 is determined by defining an energy function of the form:

$$E(K,P_S)=(P_B-P_S \otimes K)^2+\lambda_3\|K\|_1. \quad (4)$$

where $P_B$ is the blurred grayscale image 205, $P_S$ is an estimate of a sharp high-resolution grayscale image, K is the blur kernel 106, $\lambda_3$ is a weighting factor, $\otimes$ is a convolution operator, $\|\bullet\|_1$ is 1-norm operator, $E(K,P_S)$ is the energy value, which is a function of the blur kernel and the estimate of the sharp high-resolution grayscale image. It can be seen that this energy function includes a first term that is a function of a difference between the blurred image ($P_B$) and a candidate blurred image determined by convolving the estimate of the sharp high-resolution grayscale image ($P_S$) with a candidate blur kernel (K).

In one embodiment of the present invention, this MAP problem is solved by the well-known conjugate gradient method with alternating minimization to determine the blur kernel that minimizes the energy by alternately solving the partial differential equations (PDEs):

$$\frac{\partial E(K, P_s)}{\partial P_s} = 0,$$
$$\text{and } \frac{\partial E(K, P_s)}{\partial K} = 0 \quad (5)$$

For more information on solving PDEs using the conjugate gradient method, please refer to the aforementioned article "Image and depth from a conventional camera with a coded aperture" by Levin et al.

In one embodiment of the present invention, a multi-scale approach is used based on a hierarchy of scaled images to avoid being trapped in local minimum during the optimization. With this multi-scale approach, an iterative process is used that sequentially optimizes an estimate of the blur kernel at a series of scales, starting with a coarse image scale. It has been found that using 2 or 3 different scales usually works well, where each scale differs by a factor of 2.

At the coarsest scale, an initialize blur kernel step 215 is used to initialize the blur kernel K as a square kernel of a predefined extent having equal elements. A down-sample image step 220 is used to down-sample the grayscale image 205 to the current scale. For example, if 3 scales are used, the first iteration would require a 4× down-sampling, the second iteration would require a 2× down-sampling, and the third iteration would use the full-resolution image.

Next, an update blur kernel step 225 is used to compute a new estimate of the blur kernel K by solving the PDEs given in Eq. (3) using the conjugate gradient method, where the blur kernel from the previous iteration is used as the initial guess for the PDE solution. The first PDE is solved to determine an estimate of the sharp high-resolution grayscale image $P_S$, and then the second PDE is solved to determine an updated estimate of the blur kernel K. An optional threshold blur kernel step 230 (shown with dashed lines) can be used to threshold small blur kernel elements (e.g. less than 0.1% of total energy) to reduce the noise of estimation. A normalize blur kernel step 235 is used to normalize the estimated blur kernel K so that the blur kernel elements sum to 1.0.

A test 240 is used to determine whether there are additional scales that need to be processed. If there are additional scales, the current estimate of the blur kernel is up-sampled to the next scale using an up-sample blur kernel step 245. This can be performed using any well-known interpolation technique such as bi-cubic interpolation. When there are no more scales left to process, an output blur kernel step 250 is used to output the final estimate of the blur kernel K as the blur kernel 106.

Returning now to FIG. 2, in a preferred embodiment of the present invention, the sharp high-resolution image 116 is determined using a Bayesian inference method with Maximum-A-Posterior (MAP) estimation. Using the method, the sharp high-resolution image 116 is determined by defining an energy function of the form:

$$E(L)=(L \otimes K-B)^2+\lambda D(L) \quad (6)$$

where L is the sharp high-resolution image 116, K is the blur kernel 106, B is the interpolated high-resolution image 103, $\otimes$ is the convolution operator, D(L) is the combined differential image 111 and $\lambda$ is a weighting coefficient In a preferred embodiment of the present invention the combined differential image 111 is computed using the following equation:

$$D(L) = \sum_j w_j(\partial_j L)^2 \quad (7)$$

where j is an index value, $\partial_j$ is a differential operator corresponding to the $j^{th}$ index, $w_j$ is a pixel-dependent weighting factor which will be described in more detail later.

The index j is used to identify a neighboring pixel for the purpose of calculating a difference value. In a preferred embodiment of the present invention difference values are calculated for a 5×5 window of pixels centered on a particular pixel. FIG. 6 shows an array of indices 300 centered on a current pixel location 310. The numbers shown in the array of indices 300 are the indices j. For example, an index value of j=6 corresponds top a pixel that is 1 row above and 2 columns to the left of the current pixel location 310.

The differential operator $\partial_j$ determines a difference between the pixel value for the current pixel, and the pixel value located at the relative position specified by the index j. For example, $\partial_6 S$ would correspond to a differential image determined by taking the difference between each pixel in the sharp high-resolution image L with a corresponding pixel that is 1 row above and 2 columns to the left. In equation form this would be given by:

$$\partial_j L=L(x,y)-L(x-\Delta x_j,y-\Delta y_j) \quad (8)$$

where $\Delta x_j$ and $\Delta y_j$ are the column and row offsets corresponding to the $j^{th}$ index, respectively. At a minimum, it will generally be desirable for the set of differential images $\partial_j L$ to include one or more horizontal differential images representing differences between neighboring pixels in the horizontal direction and one or more vertical differential images representing differences between neighboring pixels in the vertical direction, as well as one or more diagonal differential images representing differences between neighboring pixels in a diagonal direction.

In a preferred embodiment of the present invention, the pixel-dependent weighting factor $w_j$ is determined using the following equation:

$$w_j=(w_d)_j(w_p)_j \quad (9)$$

where $(w_d)_j$ is a distance weighting factor for the $j^{th}$ differential image, and $(w_p)_j$ is a pixel-dependent weighting factor for the $j^{th}$ differential image.

The distance weighting factor $(w_d)_j$ weights each differential image depending on the distance between the pixels being differenced:

$$(w_d)_j = G(d) \qquad (10)$$

where $d = \sqrt{\Delta x_j^2 + \Delta y_j^2}$ is the distance between the pixels being differenced, and $G(\bullet)$ is weighting function. In a preferred embodiment, the weighting function $G(\bullet)$ falls off as a Gaussian function so that differential images with larger distances are weighted less than differential images with smaller distances.

The pixel-dependent weighting factor $(w_p)_j$ weights the pixels in each differential image depending on their magnitude. For reasons discussed in the aforementioned article "Image and depth from a conventional camera with a coded aperture" by Levin et al., it is desirable for the pixel-dependent weighting factor w to be determined using the equation:

$$(w_p)_j = |\partial_j L|^{\alpha-2}. \qquad (11)$$

where $|\bullet|$ is the absolute value operator and $\alpha$ is a constant (e.g., 0.8). During the optimization process, set of differential images $\partial_j L$ can be calculated for each iteration using the estimate of L determined for the previous iteration.

The first term in the energy function given in Eq. (4) is an image fidelity term. In the nomenclature of Bayesian inference, it is often referred to as a "likelihood" term. It can be seen that this term will be small when there is a small difference between the interpolated high-resolution image 103 (B) and a blurred version of the candidate sharp high-resolution image (L) which as been convolved with the blur kernel 106 (K).

The second term in the energy function given in Eq. (4) is an image differential term. This term is often referred to as an "image prior." The second term will have low energy when the magnitude of the combined differential image 111 is small. This reflects the fact that a sharper image will generally have more pixels with low gradient values as the width of blurred edges is decreased.

The update candidate sharp high-resolution image step 112 computes the new candidate sharp high-resolution image 107 by minimizing the energy function given in Eq. (4) using optimization methods that are well known to those skilled in the art. In a preferred embodiment of the present invention, the optimization problem is formulated as a PDE given by:

$$\frac{\partial E(L)}{\partial L} = 0. \qquad (12)$$

which can be solved using conventional PDE solvers. In a preferred embodiment of the present invention, a PDE solver is used where the PDE is converted to a linear equation form that can be solved using a conventional linear equation solver, such as the well-known conjugate gradient algorithm. For more details on solving PDE solvers, refer to the aforementioned article "Image and depth from a conventional camera with a coded aperture" by Levin et al. It should be noted that even though the combined differential image 111 is a function of the sharp high-resolution image L, it is held constant during the process of computing the new candidate sharp high-resolution image 107. Once the new candidate sharp high-resolution image 107 has been determined, it is used in the next iteration to determine an updated combined differential image 111.

The method of the present invention can be applied to digital image originating from any type of digital imaging system. In one embodiment of the present invention, the method is implemented as part of a digital still camera system. The method may be implemented by a processor in the digital still camera, or alternately may be implemented wholly or in part by a processor external to the digital still camera, such as a personal computer. The method of the present invention can also be used to process frames of digital videos.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

| PARTS LIST | |
|---|---|
| 10 | Data processing system |
| 20 | Peripheral system |
| 30 | User interface system |
| 40 | Data storage system |
| 100 | Receive low-resolution image step |
| 101 | Low-resolution image |
| 102 | Interpolate high-resolution image step |
| 103 | Interpolated high-resolution image |
| 104 | Initialize candidate sharp high-resolution image |
| 105 | Estimate blur kernel step |
| 106 | Blur kernel |
| 107 | Candidate sharp high-resolution image |
| 108 | Compute differential images step |
| 109 | Differential images |
| 110 | Compute combined differential image step |
| 111 | Combined differential image |
| 112 | Update candidate sharp high-resolution image step |
| 113 | New candidate sharp high-resolution image |
| 114 | Convergence test |
| 115 | Convergence criterion |
| 116 | Sharp high-resolution image |
| 117 | Store sharp high-resolution image step |
| 150 | Input pixel location |
| 160 | Output pixel location |
| 170 | Inter-pixel area |
| 180 | Interpolation neighborhood |
| 190 | Input points |
| 192 | Blur kernel |
| 194 | Interpolation line |
| 196 | Interpolated points |
| 200 | Pre-process images step |
| 205 | Grayscale image |
| 215 | Initialize blur kernel step |
| 220 | Down-sample image step |
| 225 | Update blur kernel step |
| 230 | Threshold blur kernel step |
| 235 | Normalize blur kernel step |
| 240 | Test |
| 245 | Up-sample blur kernel step |
| 250 | Output blur kernel step |
| 300 | Array of indices |
| 310 | Current pixel location |

The invention claimed is:

1. A method for increasing the resolution of a digital image, the method implemented at least in part by a data processing system and comprising:

a) receiving an input digital image of a scene, the input digital image includes an array of image pixels;
b) interpolating a high-resolution image from the input digital image using an interpolation function, wherein the interpolated high-resolution image has a higher spatial resolution than the input digital image such that the interpolated high-resolution image has more image pixels than the input digital image;
c) receiving a blur kernel associated with the interpolation function;
d) initializing a candidate sharp high-resolution image;
e) determining a plurality of differential images representing differences between neighboring pixels in the candidate sharp high-resolution image;
f) determining a combined differential image by combining the differential images;
g) updating the candidate sharp high-resolution image responsive to the interpolated high-resolution image, the blur kernel, the candidate sharp high-resolution image and the combined differential image, wherein the candidate sharp high-resolution image is updated using a Bayesian inference method that includes evaluating candidate sharp high-resolution images using an energy function;
h) repeating steps e)-g) until a convergence criterion is satisfied; and
i) storing the final candidate sharp high-resolution image in a processor-accessible memory system.

2. The method of claim 1 wherein the interpolation function is a bi-cubic interpolation function or a bi-linear interpolation function.

3. The method of claim 1 wherein the blur kernel is determined from the interpolation function and the resolution difference between the input digital image and the interpolated high-resolution image.

4. The method of claim 1 wherein the blur kernel is determined by analyzing the interpolated high-resolution image.

5. The method of claim 4 wherein the blur kernel is determined by analyzing only a subset of the image pixels in the interpolated high-resolution image, wherein the subset is determined to contain significant image detail.

6. The method of claim 5 wherein the subset of the image pixels in the blurred image is selected by:
determining a Laplacian image from the interpolated high-resolution image; and
selecting the subset of image pixels in the interpolated high-resolution image by analyzing the Laplacian image to determine a subset of image pixels containing significant image detail.

7. The method of claim 1 wherein the each of the differential images is calculated using a specified direction and distance interval for the neighboring pixels.

8. The method of claim 1 wherein the plurality of differential images include a horizontal differential image representing differences between neighboring pixels in the horizontal direction and a vertical differential image representing differences between neighboring pixels in the vertical direction.

9. The method of claim 1 wherein the energy function includes:
an image fidelity term which is a function of a difference between the interpolated high-resolution image and a candidate sharp high-resolution image determined by convolving the candidate sharp high-resolution image with the blur kernel; and
an image differential term which is a function of the combined differential image.

10. The method of claim 1 wherein the energy function is optimized using a conjugate gradient algorithm.

11. The method of claim 1 wherein the input digital image is captured using a digital camera.

12. The method of claim 1 wherein the input digital image is a frame of a digital video.

13. The method of claim 1 wherein the combined differential image is determined by a weighted combination of functions of the differential images.

14. The method of claim 1 wherein the functions of the differential images are weighted by a distance weighting factor and a pixel-dependent weighting factor.

15. A digital camera system comprising:
an image sensor for capturing an input image of a scene;
an lens system for imaging the scene onto the image sensor;
a processor-accessible memory system, and
a data processing system for performing the steps of:
a) receiving an input digital image of a scene;
b) interpolating a high-resolution image from the input digital image using an interpolation function, wherein the interpolated high-resolution image has a higher spatial resolution than the input digital image such that the interpolated high-resolution image has more image pixels than the input digital image;
c) receiving a blur kernel associated with the interpolation function;
d) initializing a candidate sharp high-resolution image;
e) determining a plurality of differential images representing differences between neighboring pixels in the candidate sharp high-resolution image;
f) determining a combined differential image by combining the differential images;
g) updating the candidate sharp high-resolution image responsive to the interpolated high-resolution image, the blur kernel, the candidate sharp high-resolution image and the combined differential image, wherein the candidate sharp high-resolution image is updated using a Bayesian inference method that includes evaluating candidate sharp high-resolution images using an energy function;
h) repeating steps e)-g) until a convergence criterion is satisfied; and
i) storing the final candidate sharp high-resolution image in a processor-accessible memory system.

16. A computer program product for increasing the resolution of a digital image comprising a non-transitory tangible computer readable storage medium storing an executable software application for causing a data processing system to perform the steps of:
a) receiving an input digital image of a scene;
b) interpolating a high-resolution image from the input digital image using an interpolation function, wherein the interpolated high-resolution image has a higher spatial resolution than the input digital image such that the interpolated high-resolution image has more image pixels than the input digital image;
c) receiving a blur kernel associated with the interpolation function;
d) initializing a candidate sharp high-resolution image;
e) determining a plurality of differential images representing differences between neighboring pixels in the candidate sharp high-resolution image;
f) determining a combined differential image by combining the differential images;
g) updating the candidate sharp high-resolution image responsive to the interpolated high-resolution image, the blur kernel, the candidate sharp high-resolution image and the combined differential image, wherein the candidate sharp high-resolution image is updated using a Bayesian inference method that includes evaluating candidate sharp high-resolution images using an energy function;

h) repeating steps e)-g) until a convergence criterion is satisfied; and i) storing the final candidate sharp high-resolution image in a processor-accessible memory system.

* * * * *